Feb. 6, 1923.
E. ANDERSON ET AL.
1,444,092
APPARATUS FOR ELECTRICAL SEPARATION OF SUSPENDED PARTICLES FROM GASES.
FILED JULY 24, 1919.
5 SHEETS—SHEET 2.
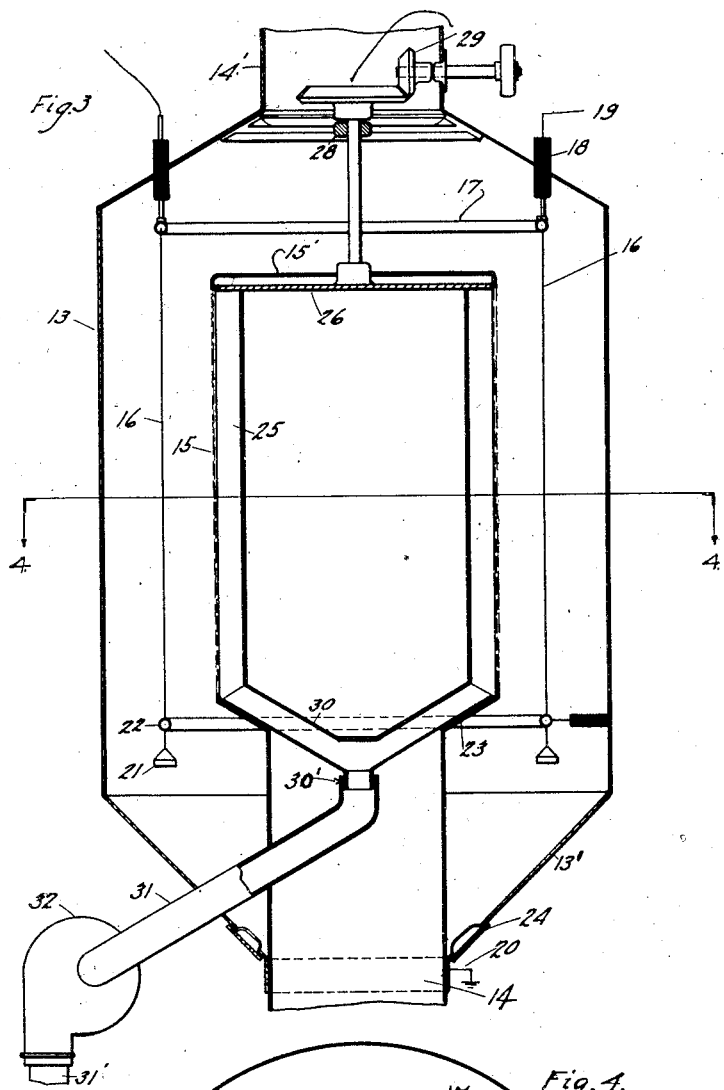
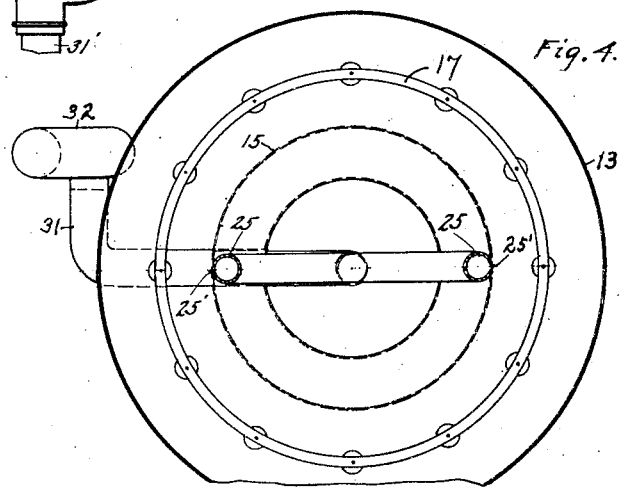
INVENTORS:
Evald Anderson
Walter A. Schmidt
BY
Arthur P. Knight
ATTORNEY

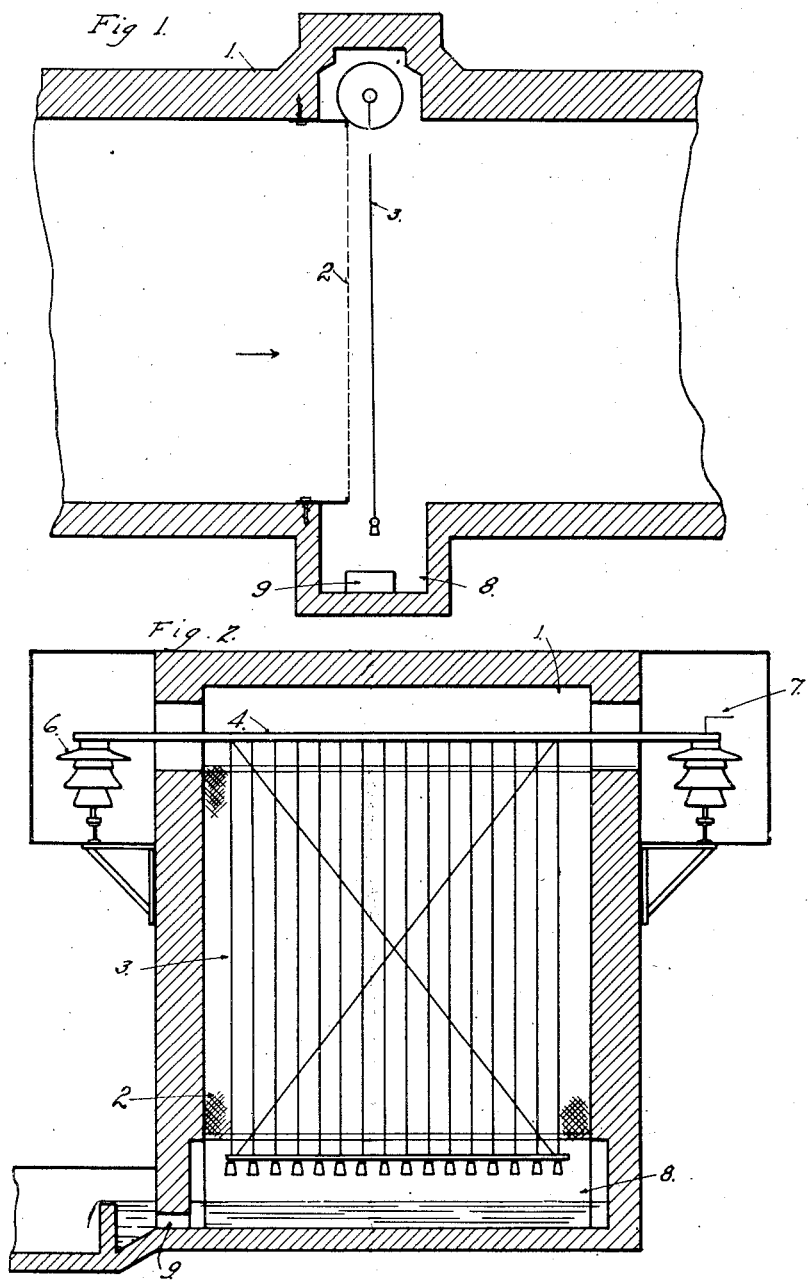

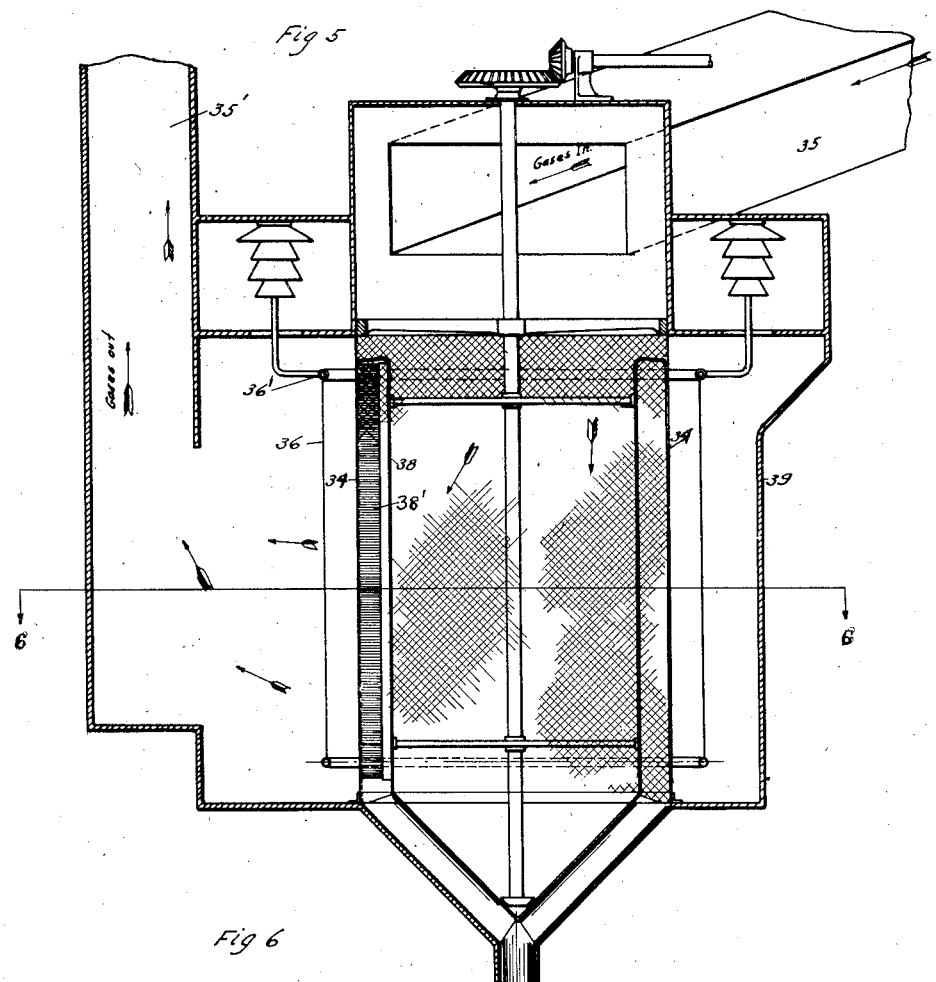

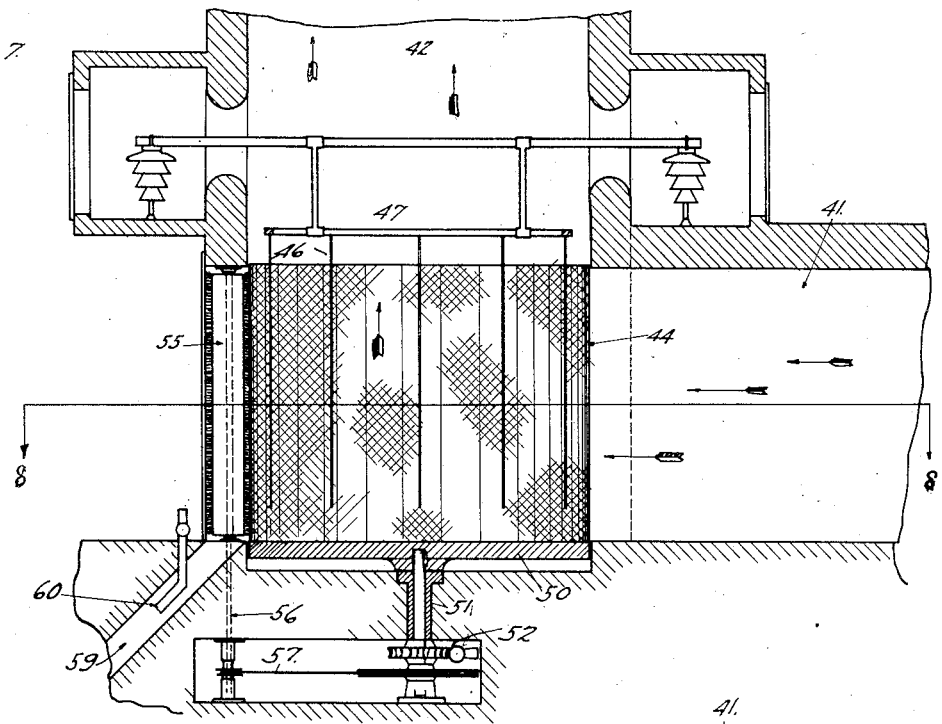
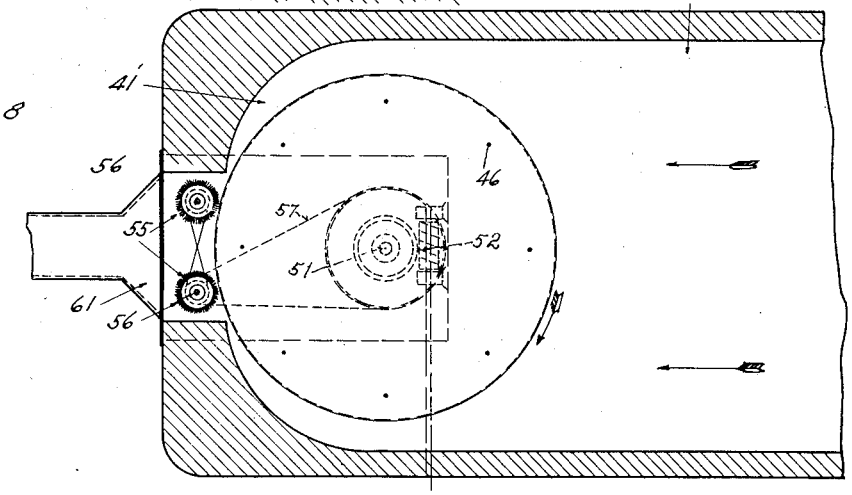

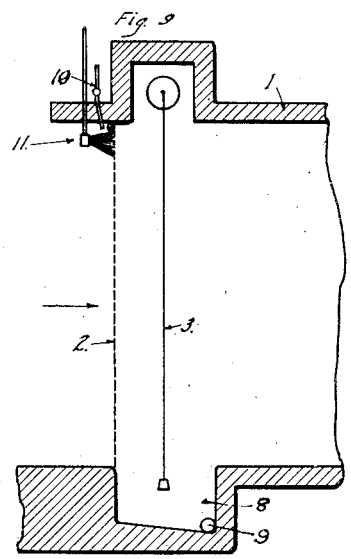
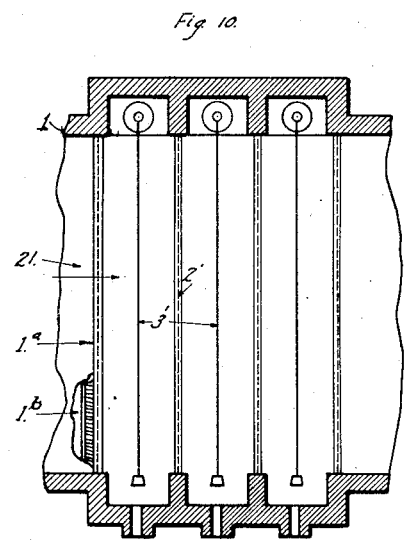
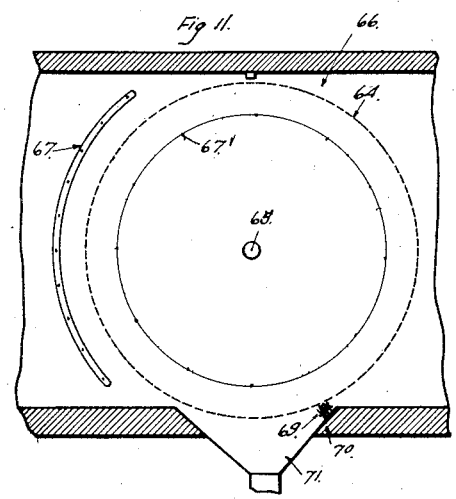
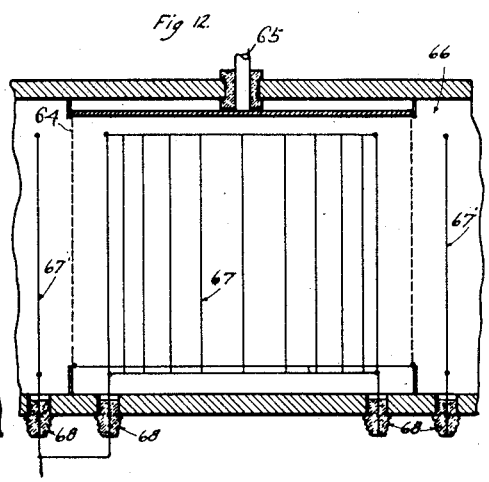

Patented Feb. 6, 1923.

1,444,092

UNITED STATES PATENT OFFICE.

EVALD ANDERSON AND WALTER A. SCHMIDT, OF LOS ANGELES, CALIFORNIA, ASSIGNORS TO INTERNATIONAL PRECIPITATION COMPANY, OF LOS ANGELES, CALIFORNIA, A CORPORATION OF CALIFORNIA.

APPARATUS FOR ELECTRICAL SEPARATION OF SUSPENDED PARTICLES FROM GASES.

Application filed July 24, 1919. Serial No. 313,102.

*To all whom it may concern:*

Be it known that we, EVALD ANDERSON and WALTER A. SCHMIDT, citizens of the United States, residing at Los Angeles, in the county of Los Angeles and State of California, have invented a new and useful Apparatus for Electrical Separation of Suspended Particles from Gases, of which the following is a specification.

This invention relates to the art of electrical precipitation of suspended material from gases, and, particularly to electrical precipitation which is effected by passing the gases between electrodes maintained at high potential difference in such manner as to cause precipitation and collection of the material on certain of the electrodes, and the main object of the invention is to provide for continual removal of the precipitated material from the collecting surfaces of the apparatus in such manner as to obtain maximum efficiency and capacity of the apparatus.

An important feature of the invention is the provision of means whereby the gases to be cleaned are passed through the collecting electrode and toward the discharge electrodes in such manner that the action of the electrical field tends to prevent the suspended material from reaching the discharge electrodes so that the discharge electrodes are maintained in relatively clean condition. With this end in view the collecting electrodes, according to our invention, are made of perforate or pervious construction to permit the gases to pass through the same with slight resistance, and the discharge electrodes are placed in the path of the gases after they pass through the collecting electrodes.

Other advantages result from passing the gases to be cleaned transversely to the electrode surfaces, among which may be mentioned increase to the maximum of the gas treating capacity of a precipitator of given size, more effective and uniform distribution of the gases and greater convenience and economy in installation of the electrical precipitator with reference to the flue or conduit carrying the gases. In applying electrical precipitators of the ordinary type to cleaning gases from large installations, it is necessary to provide collecting electrodes of extremely large area in order to provide the requisite collecting surfaces and, on the other hand, it is also necessary to so construct the electrical precipitator that the cross-section of the chamber transversely of the gas stream will be sufficient to provide for passage of the required amount of gas. With a construction in which the gases pass transversely through collecting electrodes of large superficial area, large transverse cross-sectional area of the gas stream is obtained while at the same time the dimensions of the electrical precipitator in a direction transverse to the collecting electrodes may be reduced to a minimum. Furthermore, the fact that the gas stream passes transversely to the collecting electrodes enables the latter to be placed transversely within the gas conducting flue providing an installation of extreme simplicity. By suitably proportioning the openings of the perforate collecting electrodes the latter may be made to offer a slight resistance to the passage of the gas in such manner as to ensure uniform distribution of the gas flow.

Another object of the invention is to provide improved means for removal or withdrawal of the precipitated material from the collecting surfaces, and in this connection a further object of the invention is to utilize to the full extent the field space or capacity of the apparatus by eliminating any inactive or inoperative zones in the field and by providing for cleaning of the collecting electrodes without shifting the same relatively to the electrical field.

The accompanying drawings illustrate embodiments of our invention, and referring thereto:

Fig. 1 is a vertical section of one form of the apparatus;

Fig. 2 is a transverse section thereof;

Fig. 3 is a vertical section of another form of the apparatus;

Fig. 4 is a section on line 4—4 in Fig. 3;

Fig. 5 is a vertical section of another form of the apparatus;

Fig. 6 is a horizontal section on line 6—6 in Fig. 5;

Fig. 7 is a vertical section of a further modification of the apparatus;

Fig. 8 is a horizontal section on line 8—8 in Fig. 7;

Figs. 9 and 10 are vertical sections of modifications of the form of the invention shown in Fig. 1;

Fig. 11 is a vertical section and Fig. 12 a horizontal section of another form of the invention.

In order to explain the general principles of our invention, reference may be made to Figs. 1 and 2 showing an embodiment thereof adapted for certain uses.

In a flue, conduit or chamber 1, through which the gases to be treated are passed, is mounted a perforate collecting electrode 2 of metal wire screen, perforate sheet metal, or other suitable construction, extending transversely of the flue 1 in such manner that all of the gases passing in the flue must pass through said perforate collecting electrode. Opposite said collecting electrode and parallel thereto are mounted discharge electrodes 3, consisting, for example, of wires mounted on metal frame 4 supported by insulators 6, said wires constituting a series or row of smooth elongated conductors extending parallel to one another and to the collecting electrode and being spaced apart so that each discharge electrode can maintain an ionizing field adjacent thereto. The flue 1 is shown as horizontal and the electrodes 2 and 3 as extending vertically, but it will be understood that, in general, the flue may extend in any desired direction, and the electrodes may be either perpendicularly or obliquely transverse to the flue. The collecting electrode is preferably grounded and the discharge electrodes are connected by wire 7 to any suitable source of high tension current, preferably unidirectional. Means, such as a well or launder 8, having a discharge opening 9, may be provided below the collecting electrode to receive the precipitated material falling from said electrode.

The discharge electrodes 3 are mounted behind the collecting electrode, with reference to the direction of the flow of the gas stream, so that the gas passes through the collecting electrode before it reaches the discharge electrodes.

Assuming the gas to be flowing in the direction of the arrow in Fig. 1, it passes through the collecting electrode and then toward the discharge electrodes and is subjected, while moving from the collecting electrode toward the discharge electrodes, to the action of an electrical field of sufficient intensity to cause solid or liquid particles suspended in the gases to be forced or held by electrical action, back toward the collecting electrode, in opposition to the gas stream, the suspended particles being in this manner caused to accumulate or collect on the collecting electrode. The perforations or openings in the collecting electrode are preferably sufficiently large to enable the gas to pass through same without undue resistance and to prevent them from being clogged with undue rapidity, but the size of these openings is not sufficient to prevent the electrode surface from acting as a substantially continuous surface, as far as regards the distribution of the electrical field. The deposit accumulating on the collecting electrode may be removed continuously or intermittently by any suitable means; for example, the gases being treated may be humidified or cooled so as to cause sufficient water to be condensed and precipitated on the collecting electrodes to continually wash away the precipitated solid material; or in some cases the gases to be treated may already contain sufficient moisture or suspended liquid for this purpose without further humidification. In the case of dry material to be precipitated the precipitator may be provided, as shown in Fig. 9, with suitable means, such as water supply pipe 10, for spraying water directly onto the collecting electrode to assist in the removal of the deposited material. Brushing means, indicated at 11 in Fig. 9, may also be provided, operated manually at intervals, or mechanically in a continuous or intermittent manner, to scrape or brush off or loosen adherent deposits.

An important advantage of the present invention is that the collecting electrode may constitute a screen directly across the gas conducting flue, this construction being convenient and economical to install. If desired a series of collecting electrode screens may be mounted in the flue, as indicated at 2' in Fig. 10. In this case also a collecting electrode may be so spaced on opposite sides of each set of discharge electrodes 3' that said discharge electrodes cooperate with the collecting electrodes on opposite sides thereof. The collecting electrode screens 2' may be mounted in slots 1ᵃ in the side of the flue 1 to permit withdrawal of any one of them for cleaning without disturbing the others or stopping the operation of the apparatus, and brushing means 1ᵇ may be provided for automatically cleaning the screen as it is being withdrawn or inserted.

The apparatus shown in Fig. 3 comprises a casing 13, preferably formed as a vertical cylinder of metal, for example, opening at its upper end into a stack or outlet flue 14'; a cylindrical electrode 15 formed as a vertical cylindrical screen mounted co-axially with the casing 13 and supported on and communicating with an inlet flue or pipe 14 extending upwardly through the bottom of the outer casing 13, and discharge electrodes 16 mounted in the space between the outer casing 13 and the cylindrical screen electrode 15. Said discharge electrodes 16 may consist of fine wires or other suitable conducting members constituting elongated conductors extending parallel to one another and to the collecting electrode and adapted to facilitate discharge and suspended from or mounted on an insulated frame 17 supported on insulators 18 and connected by wire 19 to suitable means for maintaining the discharge electrodes at high electric potential as compared with the collecting electrode 15, which is grounded by connection to the other metallic parts of the apparatus, as indicated at 20. Said discharge electrodes are preferably arranged in a circular series around the cylindrical electrode 15, so as to provide a substantially continuous electrical field adjacent to said collecting electrode. The discharge electrodes may be tensioned by weights 21 and spaced by an insulated frame 22 at their lower portions. The elongated conductors constituting discharge electrodes are spaced apart as shown so that each is adapted to produce an intense electrical field directly adjacent thereto, resulting in ionization and discharge of electricity from the conductor.

The cylindrical perforate collecting electrode 15 is closed at its upper end by a top plate 15' and is mounted at its lower end on a funnel 23 secured to the top of the inlet pipe 14. The bottom of the outer casing 13 may be also formed as a funnel, as indicated at 13', and may be provided with manholes 24 for removing therefrom any material that may collect therein, it being understood, however, that in the normal operation of the apparatus but little material will collect in this outer chamber or casing, the operation of the electrical field serving to continually force the material back toward the collecting electrode 15 from which it is removed by the cleaning means hereinafter described.

The cleaning means, which we prefer to use in connection with this apparatus, comprises means for forcibly drawing air through the perforate collecting electrode 15 in such manner as to draw the deposit through the perforations of said electrode and into suitable receiving means whereby they are continually carried away from the apparatus. Said receiving means may consist of vertical tubes 25 mounted on a rotating carrier means 26 carried by a vertical shaft 27 journalled in bearing 28 and driven by gearing 29, so as to cause the vertical tubes 25 to travel in a circular path adjacent to the inside of the cylindrical perforate collecting electrode 15. Each vertical tube 25 is provided with a vertical slit 25' in the portion of its wall facing the collecting electrode 15 and said vertical tubes 25 are connected at their lower ends by tubular connections 30 and slip joint 30' to a pipe 31 leading to suitable ejector means, such as a blower 32, for drawing a current of air through the vertical slits 25' in the tubes 25 and through the connections 30 and 31 and the blower 32 to an outlet pipe 31' leading to any suitable means for receiving the precipitated material.

The operation of the above described apparatus is as follows:

By suitable electric connections, as above described, the discharge electrode system is maintained at a high potential relative to the grounded collecting electrode 15, the spacing and arrangement of the discharge electrode being such as to maintain a substantially continuous electrical field around the cylindrical collecting electrode. The gases to be treated pass from the flue 14 upwardly into the space within the cylindrical perforate collecting electrode and then out through the perforations or openings in said collecting electrode into the electrical field surrounding the same and then upwardly into the outlet stack 14'. In passing through the cylindrical collecting electrode and into the surrounding electrical field the gases pass from the collecting electrode toward the discharge electrodes and in passing into and through the electrical field in this manner the gases are subjected to the action of such electrical field in such manner that the particles suspended therein become electrically charged and forced toward the collecting electrode by the action of the field. The motion thus imparted by the electrical field to the suspended particles is in reverse direction to the flow of the gas stream through the electrical field so that the electrical action tends to continually force the suspended particles toward the collecting electrode. The effect of this action is to ensure that the discharge electrodes are kept comparatively clean or free from suspended material and that the deposit or precipitate is produced almost wholly on the collecting electrode.

By the operation above described, the deposit tends to gradually accumulate on the collecting electrode and it is found that in general the presence of such a deposit on the collecting electrode leads to secondary actions, such as undesirable ionization from the collecting electrode, lowering of the arcing voltage and undue flow of current, which are inimical to efficiency of precipitation and wasteful of electrical energy. To overcome these objections we prefer to provide for continually removing the precipitated material from the collecting electrode, this being effected by the suction means consisting of the vertical tubes 25 and the suction devices connected thereto, which operate to continually draw air through the perforate collecting electrode and the deposit thereon and through the slits 25' in such tubes and then downwardly through the connections aforesaid. The cleaning or suction tubes 25 should travel sufficiently close to the perforate collecting electrode 15 to ensure effective suctional action through the openings or perforations of said electrode and the construction should be such that the amount of air thus drawn into the tubes 25 is small as compared with the total gas volume passing through the apparatus. By this means the collecting electrode is always kept in clean or almost clean condition, so that the maximum efficiency is ensured and at the same time the entire outer surface of the electrode is available for constant use as an active electrode and there is no inactive zone in the electrical field representing idle space; furthermore, the fact that both the collecting and the discharge electrodes are always substantially clean enables the discharge electrodes to be brought comparatively close to the collecting electrodes, say to within two inches difference for a voltage of say 50,000 volts, which distance is much smaller than that which is practicable where the electrodes are liable to accumulate a deposit of fume leading to excessive sparking or destructive discharge when the electrodes are positioned too close together.

The construction shown in Figs. 3 and 4 has the constructional advantage that the gases enter and leave it in an upwardly vertical flow path, so that the apparatus is adapted for positioning on or as a part of a vertical stack; other constructions may, however, be adopted without departing from our invention, for example, as shown in Figs. 5 and 6, the gases may be made to pass downwardly into the perforated collecting electrode 34 from an inlet flue 35 and outwardly through the collecting electrode and through an outer casing 39, which discharges the gases into a stack 35'. The discharge electrodes 36 in this case are mounted on an insulated frame 36' and are arranged around the cylindrical perforate collecting electrode 34 in the same manner as above described, the operation of the electrode being the same in this case as in the form shown in Figs. 1 and 2. The cleaning apparatus is also substantially of the same construction, except that in this case the suction tubes 38 are provided with brush means 38' adapted to brush the inner surfaces of the screen electrode 34. It will be understood that similar brushes may be provided in the suction tubes shown in Fig. 3.

In Figs. 7 and 8 the collecting electrode 44 is shown as a vertical cylinder of metallic screen material extending upwardly from a rotary bottom member 50 carried by the vertical shaft 51 driven by suitable driving means 52, so as to rotate at a comparatively slow velocity, said collecting electrode extending within a horizontal flue 41 whose walls converge, as shown at 41', so as to tend to force the gases inwardly through the perforate collecting electrode, which is open at the upper end so as to discharge the cleaned gases into a stack 42. The discharge electrodes 46 in this case are shown as arranged in a circular series within the collecting electrode and spaced therefrom and from one another in such manner as to provide a substantially continuous electrical field, said discharge electrodes being shown as rods extending downwardly from an insulated frame 47. A cleaning means, in this case, is illustrated as consisting of brushes 55 mounted on vertical shafts 56 driven by means 57, said brushes engaging the outer face of the collecting electrode 44 as it rotates, to brush the material therefrom, said material falling into a chute 59. If desired, suction means, for example, a hydraulic jet ejector 60, may be provided in the outlet chute 59 to produce a suction in the chamber 61 enclosing brushes 55, to assist in the cleaning operation.

The operation of the forms of the invention shown in Fig. 8 is substantially the same as above described in connection with Figs. 3 and 4. It is to be understood that in any case the relative movement of the cleaning means and the screen electrode may be effected by moving either or both of said elements, and such motion may be either continuous or intermittent, as may be considered desirable in any particular case.

Another specific embodiment of our invention is shown in Figs. 11 and 12, and comprises a screen drum 64 mounted to rotate on a shaft 65 driven by any suitable means, and extending across the flue 66 for conducting the gases to be treated. In this case the gases pass into the rotary screen drum at one side and out at the other side and are subjected repeatedly to the action of electrical fields maintained between the screen drum 64 acting as a collecting electrode and sets of discharge electrodes 67 and 67', which are mounted on suitable insulators 68. In this form of the invention the electrical field is continuous or uninterrupted, the inner discharge electrodes being arranged in a circle around the inside of the screen drum.

Cleaning of the collecting electrode may be effected in this form of the invention by any suitable means, for example, by brush means 69 operated by a driving shaft 70 and acting to brush the material from the screen drum 64 into an outlet hopper 71.

It will be understood that in each of the above described embodiments of the invention the screen material of the collecting electrode is preferably of metal and is grounded through the metallic mounting thereof, and the discharge electrodes are connected to a suitable source of high tension current, for example, as set forth in the United States patent to F. G. Cottrell—No. 895,729—dated August 11th, 1908.

What we claim is:

1. An apparatus for electrical separation of suspended particles from gases, comprising a perforate collecting electrode, discharge electrode means mounted opposite said collecting electrode to produce an electrical field between the discharge electrode means and the collecting electrode, and means for passing gas through the collecting electrode towards the discharge electrode means, and means positioned on the side of the collecting electrode which is away from the discharge electrodes, for removing material deposited thereon.

2. An apparatus for electrical separation of suspended particles from gases, comprising a perforate collecting electrode, discharge electrode means arranged on one side of said perforate collecting electrode, means for passing the gases to be treated through the perforate collecting electrode and towards the discharge electrode means, and cleaning means on the other side of said collecting electrode and comprising suctional means for drawing gases, together with deposited material, through the perforate collecting electrode.

3. An apparatus for electrical separation of suspended particles from gases, comprising a cylindrical perforate collecting electrode, a series of discharge electrodes mounted opposite the surface of said collecting electrode and providing a continuous field adjacent to said collecting electrode through the surface of said collecting electrode, and means for removing deposited material from the surface of said collecting electrode, said means being mounted on the side of said collecting electrode which is away from the discharge electrodes.

4. The combination of a perforate collecting electrode, means for passing the gases therethrough, discharge electrode means mounted in the path of said gases as they pass from the collecting electrode to produce an electrical field for forcing the suspended material in said gases toward and onto the collecting electrode, and means for removing the material deposited on the collecting electrode, said cleaning means and said collecting electrode being mounted for relative rotation to bring different portions of said collecting electrode into cooperative relation with said cleaning means.

In testimony whereof we have hereunto subscribed our names this 10th day of July, 1919.

EVALD ANDERSON.
WALTER A. SCHMIDT.